Sept. 12, 1967   M. A. CLARIDGE ET AL   3,341,014
PROCESS OF PARTICULATE MATTER SEPARATION
Filed Jan. 25, 1965   5 Sheets-Sheet 1

Maurice Arthur Claridge
Peter Maurice Jones
Raymond James Wigginton
INVENTORS.

BY
ATTORNEY.

Maurice Arthur Claridge
Peter Maurice Jones
Raymond James Wigginton
INVENTORS.

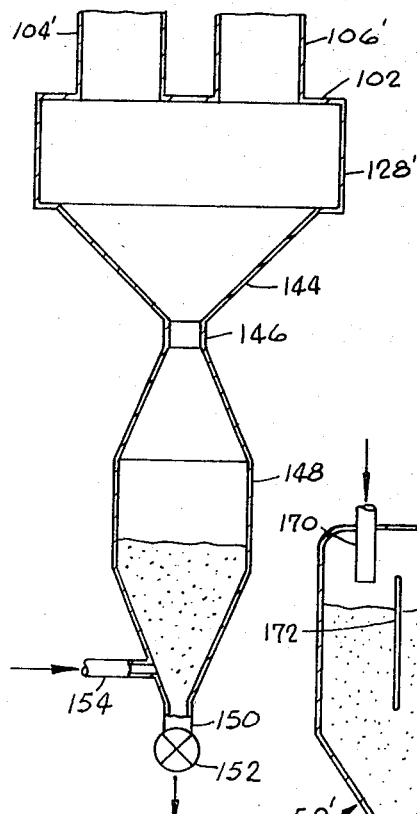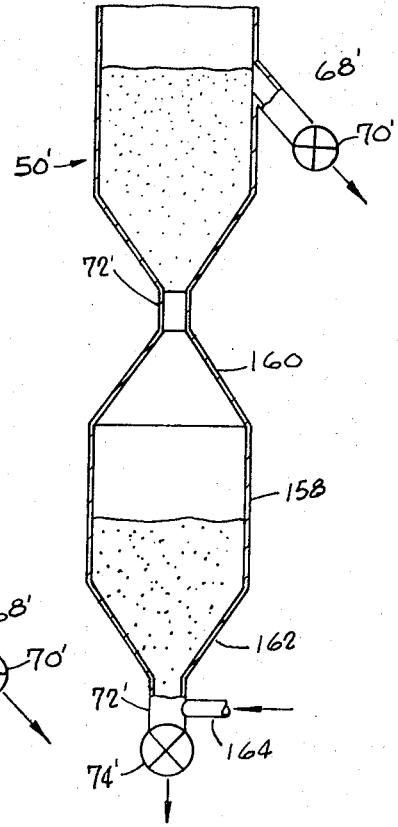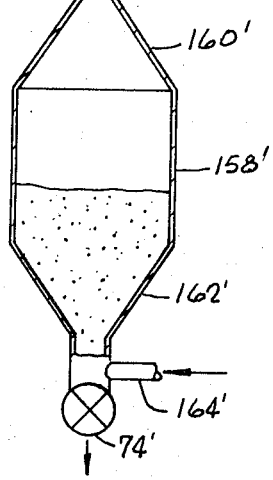

United States Patent Office 3,341,014
Patented Sept. 12, 1967

3,341,014
PROCESS OF PARTICULATE MATTER
SEPARATION
Maurice Arthur Claridge, Waltham, Grimsby, and Peter M. Jones and Raymond James Wigginton, Grimsby, England, assignors to Laporte Titanium Limited, London, England, a British company
Filed Jan. 25, 1965, Ser. No. 427,688
Claims priority, application Great Britain, Jan. 29, 1964, 3,909/64
8 Claims. (Cl. 209—422)

ABSTRACT OF THE DISCLOSURE

A process which provides, in a single apparatus, a method for treating a hot chlorine-containing gaseous suspension of pigmentary titanium dioxide and an inert particulate refractory material to separate the solids from the gases and the pigmentary titanium dioxide from the inert particulate refractory material. The process makes the separation and recovery of all three compounds from the apparatus extremely convenient.

The present invention relates to the treatment of chlorine-containing gaseous suspensions of pigmentary titanium dioxide. More particularly, the invention relates to processes and apparatus adapted for separating and recovering pigmentary titanium dioxide particles from admixture with larger inert refractory particles suspended in chlorine-containing gases.

Heretofore, in the manufacture of pigmentary titanium dioxide by the vapor phase oxidation of titanium tetrachloride, inert particulate refractory material having a particle size larger than that of the pigmentary titanium dioxide has been introduced into the oxidation reactor or into a cooler following the reactor for a variety of reasons. Thus, refractory particles may be introduced into the reactor to prevent or substantially minimize the deposition of product titanium dioxide particles on the internal wall surfaces of the reactor. Sometimes, refractory material is introduced into the cooler to quench the reaction products or to prevent or substantially minimize the deposition of pigmentary titanium dioxide particles on the inner surfaces of the walls of the cooler. In both instances, it is essential that the pigmentary titanium dioxide subsequently be separated from the inert particulate refractory material.

Previously it has been proposed to use a cyclone to achieve the necessary separation. However certain difficulties have been experienced when dry separation in a cyclone has been attempted because the pigmentary titanium dioxide tends to aggregate into flocs in the cyclone and to separate out with the said inert particulate material. Generally the use of wet cyclones gives good separation but when it is desired to recycle recovered chlorine to a chlorinator wet cyclones have the important disadvantage that their use necessitates drying the chlorine before it can be recycled.

This invention provides a process for the treatment of chlorine-containing gaseous suspension of pigmentary titanium dioxide and an inert particulate refractory material having a larger particle size than the pigmentary titanium dioxide which comprises introducing said suspension into a vessel wherein the velocity of the gaseous suspension is too low to entrain the pigmentary titanium dioxide and the said inert particulate material. As a result a bed of particulate material is formed within the vessel. An inert gas is passed upwardly through the bed of particulate material within the vessel the rate of flow of the inert gas and the internal shape and dimensions of the vessel are such that the bed adjusts itself into two superimposed layers. The first or lower layer consists principally of the said inert particulate refractory material of which at least the upper part is non-fluidized and a second or upper layer consists principally of the pigmentary titanium dioxide in a dense phase fluidized condition. Thereafter particulate material is withdrawn separately from the two layers.

The process has a number of advantageous features. Thus the particulate material is separated from the chlorine-containing gases in which it was suspended. Furthermore a high degree of separation between the two components of the particulate material is achieved. Also, the inert gas substantially dechlorinates the pigmentary titanium dioxide. Further, if the gaseous suspension has not been subjected to a quick cooling or quenching treatment, this is effected when the suspension enters the vessel.

The separating vessel preferably is mounted with its axis substantially vertical, and the gaseous suspension preferably is introduced into the vessel at or towards the top thereof. To minimize or prevent the entrainment of pigmentary titanium dioxide in the gas stream leaving the separating vessel, that portion of the vessel into which the gaseous suspension is introduced preferably is of larger cross-sectional area than the lower part of the vessel in which the bed of particulate material forms.

Preferably, the lower portion of the vessel is of reduced cross-sectional area towards the bottom thereof to provide a region wherein the said inert particulate material may be maintained in a dense phase fluidized condition. The particulate material consisting principally of the said inert particulate refractory material is withdrawn from that region. Also, the particulate material consisting principally of the said inert particulate material is preferably withdrawn through a pipe wherein the particulate material is maintained in a dense phase fluidized condition.

The first or lower layer consisting principally of the said inert particulate refractory material my be surmounted directly by the second layer consisting principally of pigmentary titanium dioxide. However, the lower part of the vessel may be of a reduced cross-sectional area over a sufficient portion of its height whereby to provide a constriction through which the said inert particulate material can fall, but which by reason of the increased gas velocity within the constriction, serves as a support for the fluidized layer consisting principally of titanium dioxide. In this case, the process may be modified by arranging that the whole of the first layer consisting principally of the said inert particulate material is maintained in a dense phase fluidized condition.

The inert gas may be introduced into the vessel in any manner desired. However, it must pass through the entire bed of particulate material and provide satisfactory fludization of the pigmentary titanium dioxide. The vessel is preferably provided with a conical bottom through which the inert gas is introduced. The inert gas is preferably supplied to the vessel through a pipe within which the gas velocity is sufficiently high to maintain the said inert particulate material in a dense phase fluidized condition. The supply pipe is provided with an outlet for the withdrawal of the said inert particulate material, the portion of the pipe between the said outlet and the entrance to the vessel being substantially vertical.

Particulate material from the fluidized layer consisting principally of pigmentary titanium dioxide may be withdrawn through an outlet in the side wall of the vessel. Preferably, the lower part of the vessel is U-shaped, one limb communicates with the upper part of the vessel, the particulate material consisting principally of pigmentary titanium dioxide is withdrawn from the other limb, and the level of the top of the layer consisting principally of the said inert particulate material is maintained below the bottom of the said other limb. This arrangement reduces the possibility that any of the said inert particulate material will reach the titanium dioxide outlet.

The particulate material is advantageously withdrawn intermittently from the two layers.

The inert particulate refractory material may be zircon particles, or alumina particles, or titanium dioxide particles that have been withdrawn from a fluidized bed of titanium dioxide particles used in a process for the manufacture of titanium dioxide by the vapor phase oxidation of titanium tetrachloride within the bed. Advantageously, the material is silica sand. The material may also be a mixture of more than one of these materials. A typical particle size range for the inert particulate refractory material would be −8 to +30 mesh (B.S.S.). In terms of particle diameters, this represents a range of from approximately 500 to 2000 microns, which is to be compared with a typical particle size range of from 0.1 to 0.5 micron for the pigmentary titanium dioxide. Of course, particles of this size may agglomerate into loosely packed, low density clusters which are smaller in size and lower in density than the inert refractory material. Thus, the difference in size and density between the two components is sufficiently great to make it convenient to control the rate of introduction of the inert gas and to ensure that only the pigmentary titanium dioxide is fluidized in the vessel.

The term "inert gas" is used throughout the instant specification and appended claims to mean a gas that, under the conditions prevailing within the first-mentioned vessel, is chemically inert with respect to any of the substances present in that vessel, and it excludes the halogens. The inert gas is preferably nitrogen.

In general, the particulate material withdrawn from the upper layer will be found to contain some of the said inert particulate material and the particulate material withdrawn from the first or lower layer will be found to contain some pigmentary titanium dioxide, so that further separation is usually desirable.

The particulate material withdrawn from the second or upper layer, which consists principally of pigmentary titanium dioxide, is advantageously treated by incorporating water with it and agitating the resultant slurry. A small quantity of a dispersing agent, for example, sodium silicate, is preferably incorporated with the slurry prior to or during the agitation of the slurry. The agitation breaks up aggregated and a substantially complete separation of the pigmentary titanium dioxide from the said inert particulate material is achieved. Instead, the particulate material withdrawn from the second or upper layer may be introduced into a second vessel in which the pigmentary titanium dioxide, but not any of the said inert particulate refractory material, is maintained in a dense phase fluidized condition by the upward passage through the material of a mixture of water vapor and air. Any of the said particulate material that may be present is withdrawn from the bottom of the second vessel and a component consisting substantially wholly of pigmentary titanium dioxide is withdrawn separately from the second vessel. In addition to effecting a further degree of separation, the water vapor removes any residual chlorides.

It will usually be desired to recycle the said inert particulate material to the reactor and/or the cooler, and the particulate material withdrawn from the lower layer in the first-mentioned vessel, which particulate material consists principally of the said inert particulate material, may be recycled directly or after being subjected to a further separation by agitating a slurry of the material as described in connection with the further separation of the pigmentary component. The further separation may be aided by the use of a dispersing agent. Any of the said inert particulate material obtained from a further separation of the pigmentary component may also be recycled to the reactor and/or to the cooler. It is of course important that the said inert particulate material be substantially dry before it is recycled. Thus, if the material has been subjected to a further separation involving the formation of a slurry, it must be dried before being recycled to the reactor and/or the cooler.

If the pigmentary titanium dioxide is to be subjected to a subsequent surface treatment, the first separation may be sufficient, because most forms of surface treatment will separate out any small quantity of the said inert particulate material that may be present in admixture with the pigmentary titanium dioxide.

For a more complete understanding of the present invention, reference is made to the following description taken in conjunction with the accompanying drawing, FIGURE 1, of which, illustrates schematically one aspect of the process of this invention;

FIG. 6 is an axial view, partly in cross-section, taken through the lower part of a fourth form of separating vessel;

FIG. 7 is an axial view, partly in cross-section, taken through the lower part of a fifth form of separating vessel; and FIG. 8 is an axial view, partly in cross-section, taken through a sixth form of separating vessel.

Figure 1:
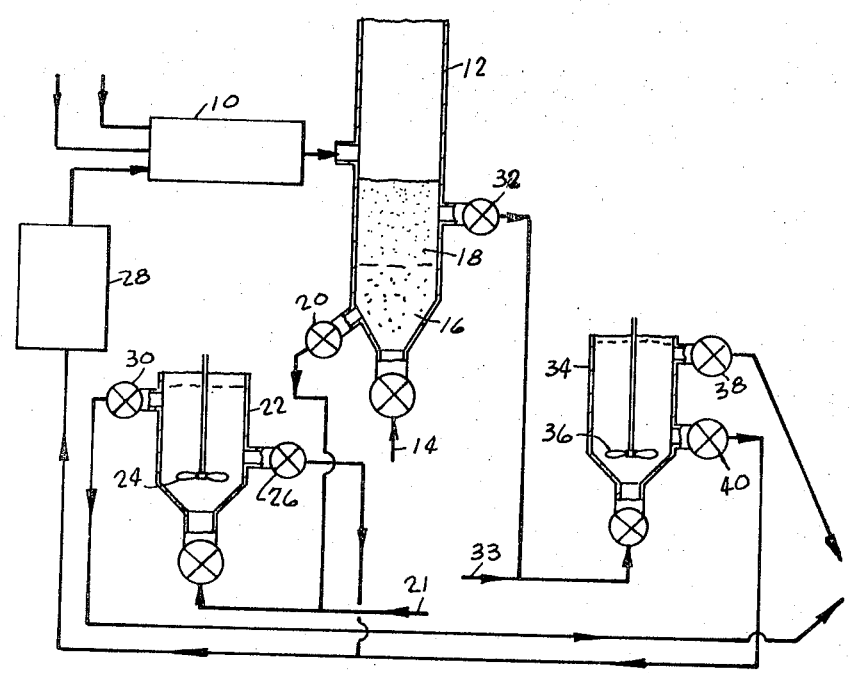

Referring to FIG. 1 of the drawings, in accordance with one aspect of the process of this invention, preheated oxygen or oxygen-containing gas and preheated titanium tetrachloride vapor are introduced into a reactor 10 wherein the titanium tetrachloride undergoes oxidation in the vapor phase to form pigmentary dioxide titanium particles. The latter are carried out of reactor 10 in suspension in the gas stream. To prevent or substantially minimize the deposition of product titanium dioxide particles upon the inner wall surfaces of the reactor, an inert particulate refractory material, for example, silica sand, also is introduced into reactor 10 and is carried forward from the reactor in suspension in the gas stream.

The gaseous suspension leaving reactor 10 is introduced into a vertically mounted separating vessel 12, which is generally cylindrical and has a conical bottom through which an inert gas, for example, nitrogen, is introduced through line 14. In the separating vessel 12 the reaction products are quenched to a temperature below 900° C. (preferably below 650° C.). Gases pass out the top of vessel 12 and the separated sand and pigmentary titanium dioxide fall to the bottom of the vessel. The velocity of the nitrogen is such that in the separator there is formed a non-fluidized layer 16, consisting principally of silica sand, surmounted by a fluidized layer 18 consisting principally of titanium dioxide.

Particulate material comprising primarily sand and a minor amount of pigment is withdrawn periodically from the layer 16 through a valve 20. That material is mixed with water introduced at 21 and conveyed into the bottom of a vessel 22 provided with a stirrer 24. The action of the stirrer 24 causes particulate aggregates or clumps of particles to be broken up and facilitates substantially complete separation of any pigmentary titanium dioxide that may be present in admixture with the sand. Wet sand is withdrawn from the vessel 22 through a valve 26, conveyed to dryer 28 and then is recycled to reactor 10. A slurry of the pigment is withdrawn from vessel 22 through valve 30 and is carried forward to a treating or finishing step (not shown) further along in the titanium dioxide producing process.

Particulate material is also withdrawn periodically from the layer 18 in the separating vessel 12 through a valve 32, admixed with water introduced at 33 and conveyed into the bottom of a vessel 34 provided with a stirrer 36. The action of the stirrer 36 causes particulate aggregates or clumps of particles to be broken up and facilitates substantially complete separation of the pigmentary titanium dioxide from any sand that may be present. A slurry of pigment is withdrawn from vessel 34 through an upper valve 38 and is carried forward to the treating or finishing step (not shown) further along in the titanium dioxide producing process. Sand and water are withdrawn from vessel 34 through a lower valve 40, conveyed to dryer 28 and then recycled to reactor 10.

Figure 2:
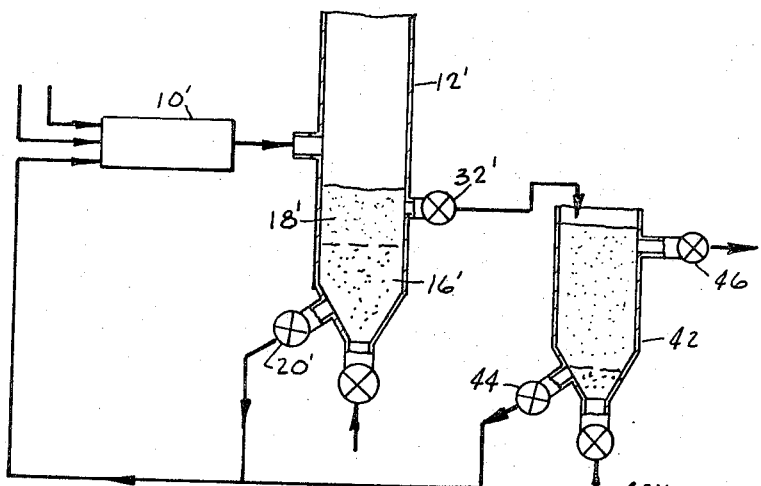
FIG. 2 illustrates schematically another aspect of the process of this invention.

Referring to FIG. 2 of the drawings, in accordance with another aspect of the process of this invention, there is illustrated a reactor 10' and a separating vessel 12' having the same structure described with respect to FIG. 1. In the apparatus illustrated in FIG. 2, the particulate material withdrawn from the non-fluidized layer 16' in the separating vessel 12' through a valve 20' is recycled directly to the reactor 10' while the particulate material withdrawn from the fluidized layer 18' through a valve 32' is introduced into the top of a vertically mounted generally cylindrical vessel 42. That vessel has a conical bottom through which air and water vapor are introduced into the vessel through line 43 at a rate sufficient to maintain the pigmentary titanium dioxide, but not any silica sand that may be present, in a dense phase fluidized condition. Any silica sand that may be present in vessel 42 forms a non-fluidized layer at the bottom of the vessel. Such sand is withdrawn periodically through a valve 44 and then is recycled to the reactor 10'. Substantially pure titanium dioxide is withdrawn periodically from the vessel 42 through a valve 46 and is carried forward to a treating or finishing step (not shown) further along in the titanium dioxide producing process.

Figure 3:
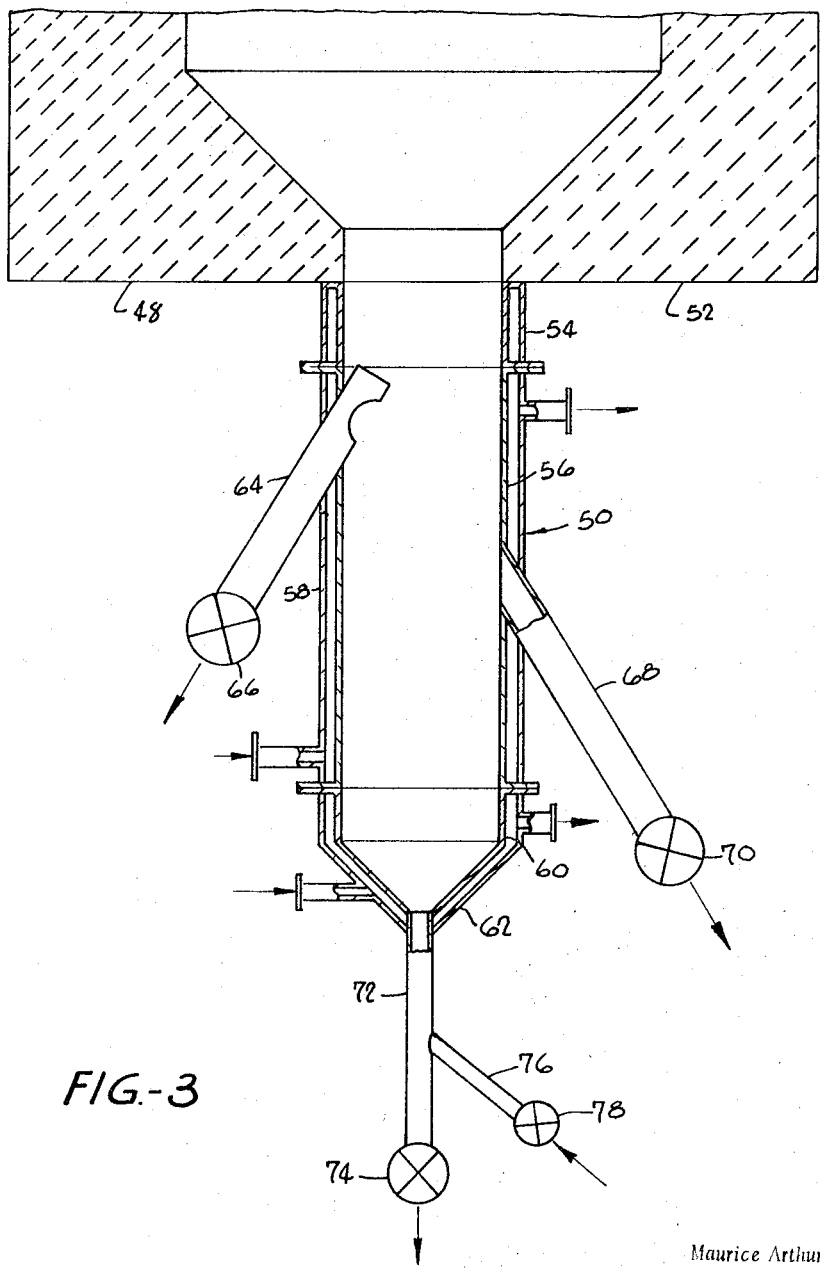
FIG. 3 is an axial view, partly in cross-section, taken through the lower part of one form of separating vessel.

Referring to FIG. 3 of the drawings, there is illustrated one form of apparatus suitable for effecting the separation of pigmentary titanium dioxide from admixture with particulate refractory material. The apparatus comprises an upper part, indicated generally by reference numeral 48 of relatively large cross-section and a lower part, indicated generally by reference numeral 50 of relatively small cross-section.

The upper part 48 of the vessel is provided with a lining of refractory material 52. Near the top of part 48 there is provided an inlet (not shown) for the gaseous suspension produced in an oxidizer or reactor and an outlet (not shown) for the gases. The bottom portion of the upper part 48 tapers downwardly and is of frusto-conical form leading to a short section of right circular cylindrical form of the same internal diameter as the lower part 50 of the vessel.

The lower part 50 of the vessel is constructed of metal and is of generally cylindrical form. It comprises three portions, an upper portion 54, a middle portion 56 provided with a cooling jacket 58 and a lower portion 60 which terminates in a conical bottom provided with a cooling jacket 62. The middle portion 56 is provided with an outlet communicating with a tube 64 and a valve 66 and an outlet communicating with a tube 68 and a valve 70.

At the apex of the conical bottom of the lower portion 60, an opening provides communication with the upper end of a vertical tube 72 which is provided with a valve 74 at its other end. A branch tube 76 leads off the tube 72 and it is provided with a valve 78.

In operation, the particulate titanium dioxide and inert refractory material drop out of the gaseous suspension in the upper part 48 of the vessel and fall into the lower part 50 wherein the pigmentary titanium dioxide, but not the inert particulate refractory material, is maintained in a dense phase fluidized condition by a flow of inert gas such as nitrogen introduced through the valve 78 and the tube 76. The inert refractory material drops into the tube 72, wherein it is fluidized and from which it is periodically withdrawn through valve 74. Pigmentary titanium dioxide is periodically withdrawn through either tube 64 and valve 66 or tube 68 and valve 70 and then is carried forward to a treating section (not shown) further along in the titanium dioxide producing plant.

Figure 4:
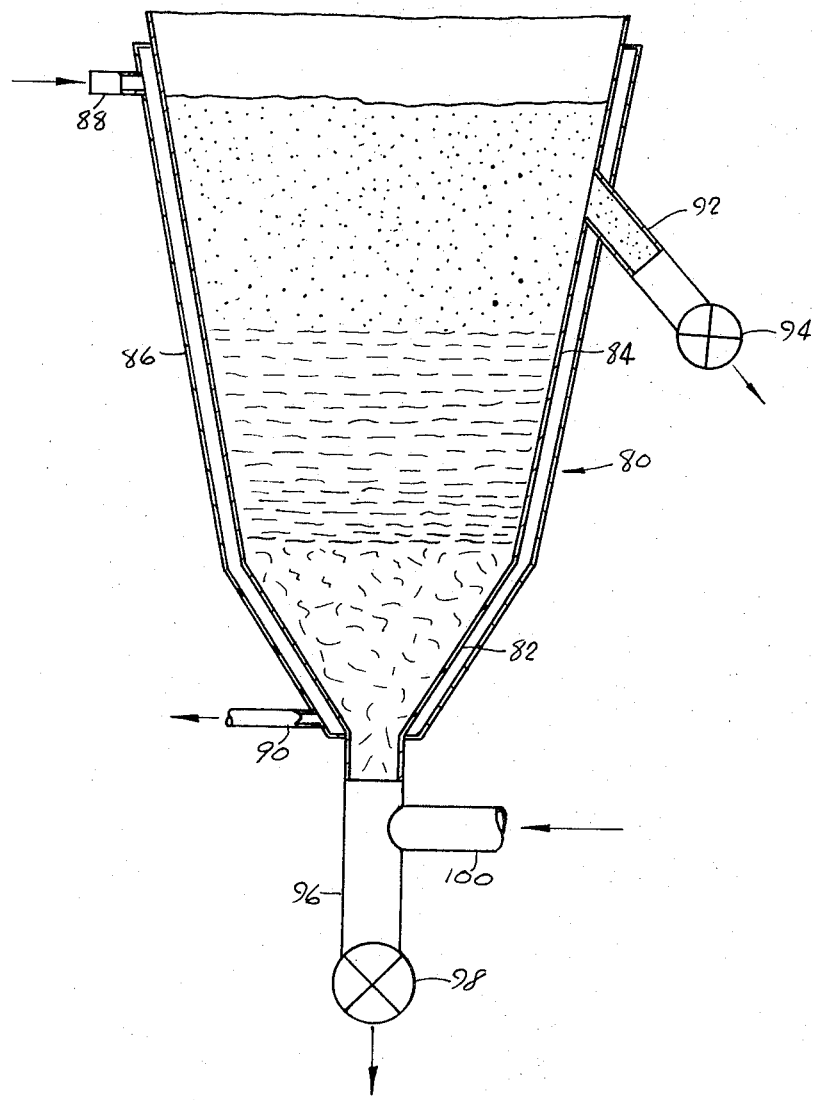
FIG. 4 is an axial view, partly in cross-section, taken through the lower part of a second form of separating vessel.

Referring to FIG. 4 of the drawings, there is illustrated another form of apparatus suitable for effecting the separation of pigmentary titanium dioxide from admixture with the particulate refractory material. The apparatus includes an upper part, not shown, but which is generally similar to the upper part 48 shown in FIG. 3 of the drawings, and a lower part, indicated generally by the reference numeral 80, of relatively small cross-section.

The lower part 80 of the apparatus is constructed of metal and is tapered downwardly, the lower portion 82 being more sharply tapered than the upper portion 84. The whole of the lower part 80 is provided with a cooling jacket 86 having a cooling fluid inlet 88 and an outlet 90. The upper portion 84 is provided with an outlet communicating with a tube 92 and a valve 94.

At the bottom of the lower portion 82 an opening provides communication with the upper end of a tube 96 which is provided with a valve 98. A branch tube 100 opens into tube 96 above the valve 98.

In operation, the particulate titanium dioxide and inert refractory material drops out of the gaseous suspension in the upper part of the apparatus and falls into the lower part 80. An inert gas, for example, nitrogen, is introduced through tubes 100 and 96. Within the lower part 80 of the vessel, the particulate material forms a bed composed of a fine layer consisting principally of the inert particulate refractory material surmounted by a second layer consisting principally of pigmentary titanium dioxide. The lower part of the first layer (approximately the part contained in the lower portion 82 of the lower part 80 of the vessel) is maintained in a dense phase fluidized condition by the inert gas. The upper part of the first layer is not fluidized because of the decreased gas velocity resulting from the increased diameter of the vessel. The second layer, however, is maintained in a dense phase fluidized condition despite the still further reduced gas velocity obtaining within that portion of the vessel, because of the smaller particle size of the pigmentary titanium dioxide. Material, primarily inert refractory particles, is withdrawn from the first layer through the tube 96 and valve 98. Particles comprised primarily of titanium dioxide are withdrawn from the second layer through the tube 92 and valve 94 and carried forward for further treatment (not shown).

Figure 5:
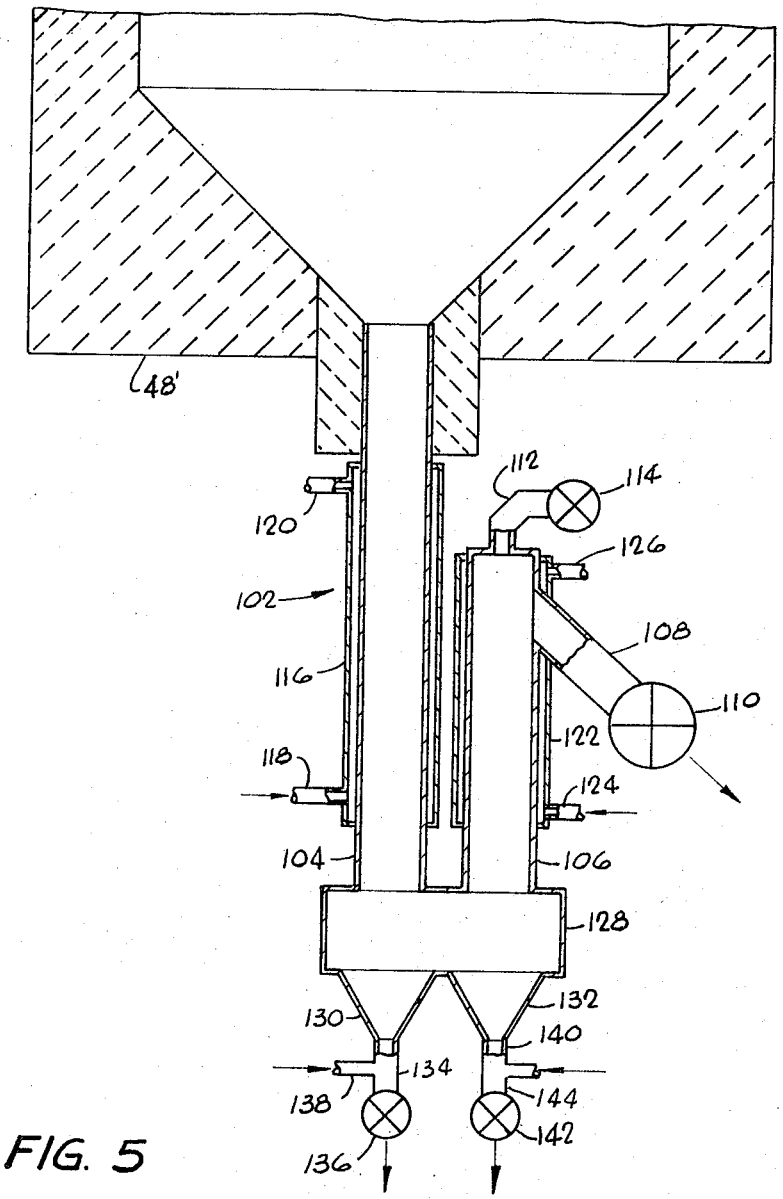
FIG. 5 is an axial view, partly in cross-section, taken through the lower part of a third form of separating vessel.

Referring to FIG. 5 of the drawings, there is illustrated still another form of apparatus suitable for effecting the separation of the two components of the particulate material. The apparatus comprises an upper part 48', which is the same as the upper part 48 of the apparatus shown in FIG. 3, and a lower part indicated generally by the reference numeral 102.

The lower part 102 is of generally U-shaped form, with one limb 104 extending downwardly from the upper part 48' of the vessel and the other limb 106 being provided with an outlet communicating with a tube 108 and a valve 110. From an opening in the otherwise closed top of the limb 106, there is a tube 112 provided with a valve 114.

The limb 104 is provided with a cooling jacket 116 having a cooling fluid inlet 118 and an outlet 120. The limb 106 is provided with a cooling jacket 122 having a cooling fluid inlet 124 and an outlet 126.

Limbs 104 and 106 join to form a chamber 128, the horizontal cross-section of which is rectangular and from which there depend two downwardly tapering conical portions 130 and 132. Conical portion 130 is coaxial with the limb 104 and conical portion 132 is coaxial with limb 106. At the apex of the conical portion 130, an opening communicates with the upper end of a tube 134 provided with a valve 136. A branch tube 138 opens into tube 134 above the valve 136. Similarly, at the apex of the conical portion 132, an opening communicates with the upper end of a tube 140 provided with a valve 142. A branch tube 144 opens into the tube 140 above the valve 142.

In operation, the particulate titanium dioxide and inert refractory material drop out of the gaseous suspension in the upper part 48' of the vessel and fall into the limb 104 and then into chamber 128 of the lower part 102 of the apparatus. An inert gas such as nitrogen is introduced into the lower part 102 of the vessel through the branch tubes 138 and 144. Valve 114 is adjusted in a manner such that the inert gas passes upwardly through limbs 104 and 106 at substantially the same rates of flow.

The rate of introduction of inert gas and the cross-sectional areas of the various portions of the lower part 102 of the apparatus are such that the pigmentary titanium dioxide is maintained in a dense phase fluidized condition within the limbs 104 and 106 and within the chamber 128. The inert particulate refractory material, on the other hand, is maintained in a dense phase fluidized condition only in the tubes 134 and 140 and in the lower part of the conical portions 130 and 132.

Particulate material, consisting principally of the said inert refractory material, is withdrawn through valves 136 and 142 either continuously or intermittently at such a rate as to maintain the level of that component below the top of the chamber 128. The said inert refractory material thus forms a layer in chamber 128 which is surmounted by a layer of material consisting principally of pigmentary titanium dioxide maintained in a dense phase fluidized condition. In the limb 104, inert refractory material falls downwardly through the fluidized pigmentary titanium dioxide. However, the material in limb 106 consists substantially entirely of pigmentary titanium dioxide and this material is withdrawn through tube 108 and valve 110 and is carried forward to a treating or finishing section (not shown) further along in the titanium dioxide producing plant.

Referring to FIG. 6 of the drawings, a fourth form of apparatus suitable for effecting the main separation of the two components of the particulate material is illustrated. This apparatus is the same in form as the vessel shown in FIG. 5, so far as the chamber 128' and the part of the vessel above the chamber 128' are concerned. Below the chamber 128', however, the conical portions 130 and 132 (of FIG. 5) are replaced by a single conical portion 144. At the apex of conical portion 144, an opening communicates with the upper end of a tube 146 which in turn communicates with a chamber 148 having conical end portions. At its bottom, chamber 148 is provided with an outlet leading to the upper end of tube 150 provided with a valve 152. A supply tube 154 for an inert gas such as nitrogen opens into the side of the lower conical end portion of the chamber 148.

In operating the vessel shown in FIG. 6, the inert gas is introduced through the tube 154 and particulate material is withdrawn through the valve 152 in such manner that the top of the layer of the said inert particulate material is maintained in the chamber 148. The rate of introduction of inert gas through the tube 154 is sufficiently high to ensure that pigmentary titanium dioxide will not pass downwardly through tube 146 into the chamber 148 while the said inert refractory particulate material will fall downwardly through the constriction formed by the tube 146 and into the chamber 148. At least the lower portion of the resulting layer in chamber 148 is maintained in a dense phase fluidized condition by the introduction of the inert gas.

The form of apparatus shown in FIG. 6 may be modified by replacing the single conical portion 144 with two conical portions, one being placed under each of the limbs 104' and 106'.

Referring to FIG. 7 of the drawings, a fifth form of apparatus suitable for effecting the main separation of the two components of the particulate material is illustrated. The vessel is similar to the one shown in FIG. 3 except that the tube 72' is formed with a central portion 158 of enlarged diameter between frusto-conical top and bottom portions 160 and 162, respectively, with the branch tube 164 opening directly into the lower portion of 72'.

In operating the vessel shown in FIG. 7, inert particulate refractory material is withdrawn through valve 74' at such a rate that the top of the layer of the said inert material is maintained in the portion 158 of the tube 72' and the rate of introduction of inert gas through the branch tube 164 is maintained sufficiently high to ensure that pigmentary titanium dioxide cannot pass downwardly through the upper part of the tube 72', which serves as a constriction, into the central portion 158 of enlarged diameter. Pigmentary titanium dioxide is withdrawn through tube 68' and valve 70' and carried forward to a subsequent treating operation (not shown).

Referring to FIG. 8 of the drawings, a sixth form of vessel suitable for effecting the main separation of the two components of the particulate material is illustrated. This vessel has the same lower part as that described with reference to FIG. 7, but its upper part is provided with two openings. One opening leads to an outlet tube 168 for the escape of separated gases and the other opening has a vertical tube 170 passing through it for the introduction into the vessel of the gaseous suspension to be treated. It will be noted that the outlet tube 64 and associated valve 66 of the vessel shown in FIG. 3 are omitted from the vessel of FIG. 8 and that the tube 170 in the vessel is situated on the side remote from the tube 68'. A vertical baffle plate 172 is situated within the vessel between the inlet tube 170 and the outlet tube 168 and prevents any of the said inert particulate material from passing directly from the inlet tube 170 to the tube 68'.

The manner of operation when using the form of vessel illustrated in FIG. 8 is the same as that when using the form of vessel described and illustrated with reference to FIG. 7.

To illustrate the invention even more fully, the following specific example is set forth.

*Example*

A chlorine-containing gaseous suspension of pigmentary titanium dioxide and silica sand from a reactor, wherein the titanium dioxide had been formed by the vapor phase oxidation of titanium tetrachloride, was introduced into the upper part 48 of a separating vessel having the structure as shown in FIG. 3. The pigmentary titanium dioxide had a particle size range of from about 0.1 to 0.5 micron and the silica sand had a particle size range of from about −10 to +27 mesh (British Screen Size). The gaseous suspension was introduced into the separating vessel at a rate of 500 pounds per hour.

The pigmentary titanium dioxide, but not the silica sand, was maintained in a dense phase fluidized condition in the lower part 50 of the separating vessel by introducing nitrogen through tube 72 at a rate of 230 cubic feet per hour (measured at N.T.P.). The nitrogen also served to fluidize the silica sand in the tube 72.

Particulate material was withdrawn through the valve 70 at five minute intervals and was found to contain about 98.5% by weight of pigmentary titanium dioxide, the balance being silica sand. Particulate material was also withdrawn through the valve 78 at five minute intervals and was found to contain about 94.0% by weight of silica sand, the balance being pigmentary titanium dioxide.

While the invention has been described with respect to what at present are considered to be preferred embodiments thereof, it will be understood that certain changes, substitutions, modifications and the like may be made without departing from its true scope.

What is claimed is:

1. A process for the treatment of a hot chlorine-containing gaseous suspension of pigmentary titanium dioxide and an inert particulate refractory material having a larger particle size than the pigmentary titanium dioxide to separate the solids from the gases and separate the pigmentary titanium dioxide from the inert particulate refractory material which comprises, introducing said suspension into a vessel towards the top thereof wherein the velocity of the gaseous suspension is too low to entrain the pigmentary titanium dioxide and the said inert particulate material whereby the solids separate from the gases and fall into a lower portion of the vessel to form a bed of particulate material, passing an inert gas upwardly through said bed of particulate material within the vessel, the rate of flow of said inert gas and the internal shape and dimensions of the vessel being such that the bed adjusts into two superimposed layers including a lower layer consisting principally of the said inert particulate refractory material, of which at least the upper part is non-fluidized, and an upper layer consisting principally of the pigmentary titanium dioxide which is in a dense-phase fluidized condition, and separately withdrawing particulate material from a fluidized portion of said lower layer and pigmentary titanium dioxide from said fluidized upper layer.

2. A process as set forth in claim 1, wherein the lower part of the vessel is of reduced cross-sectional area to provide a region wherein the said inert particulate refractory material is maintained in a dense-phase fluidized condition, and particulate material consisting principally of the said inert particulate material is withdrawn from that region.

3. A process as set forth in claim 1, wherein the lower part of the vessel is of reduced horizontal cross-sectional area over a portion of its height to provide a constriction through which the said inert particulate material can fall and which, by reason of the increased gas velocity within the constriction, serves as a support for the fluidized layer consisting principally of titanium dioxide.

4. A process set forth in claim 1, wherein the vessel is provided with a conical bottom through which the inert gas is introduced.

5. A process as set forth in claim 1, wherein the inert gas is supplied to the vessel through a pipe within which the gas velocity is sufficiently high to maintain the said inert particulate material in a dense-phase fluidized condition, and the supply is provided with an outlet for the withdrawal of the said inert particulate material, the portion of the pipe between the said outlet and the entrance to the vessel being substantially vertical.

6. A process as set forth in claim 1, wherein particulate material from the fluidized layer consisting principally of pigmentary titanium dioxide is withdrawn through an outlet in the side wall of the vessel.

7. A process as set forth in claim 1, wherein the lower part of the vessel comprises a pair of limbs arranged in a U-shape, one limb communicating with the lower part of the vessel, the other limb being adapted for withdrawal of particulate material consisting principally of pigmentary titanium dioxide, and the level of the top of the layer consisting principally of the said inert particulate material being maintained below the bottom of the said other limb.

8. A process as set forth in claim 1, wherein the inert gas is nitrogen.

References Cited

UNITED STATES PATENTS

| 2,311,954 | 2/1943 | McLean | 209—474 X |
| 2,865,504 | 12/1958 | Zubrzycki, et al. | 209—138 |
| 3,105,736 | 10/1963 | Groves | 34—57 |
| 3,109,708 | 11/1963 | Walmsley | 106—300 X |
| 3,245,818 | 4/1966 | Evans, et al. | 106—300 X |
| 3,253,889 | 5/1966 | Wildt, et al. | 106—300 X |

FOREIGN PATENTS 600,326  4/1948  Great Britain.

HARRY B. THORNTON, *Primary Examiner.*

TIM R. MILES, *Examiner.*

L. H. EATHERTON, *Assistant Examiner.*